United States Patent
Srirattana et al.

(10) Patent No.: US 10,763,568 B2
(45) Date of Patent: *Sep. 1, 2020

(54) ELECTROMAGNETIC COUPLER ARRANGEMENTS FOR MULTI-FREQUENCY POWER DETECTION, AND DEVICES INCLUDING SAME

(71) Applicant: SKYWORKS SOLUTIONS, INC., Woburn, MA (US)

(72) Inventors: Nuttapong Srirattana, Lexington, MA (US); David Ryan Story, Ladera Ranch, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,999

(22) Filed: Aug. 23, 2019

(65) Prior Publication Data

US 2019/0379099 A1    Dec. 12, 2019

Related U.S. Application Data

(63) Continuation of application No. 15/628,749, filed on Jun. 21, 2017, now Pat. No. 10,403,955.
(Continued)

(51) Int. Cl.
*H01P 5/18*    (2006.01)
*H04B 1/48*    (2006.01)
(Continued)

(52) U.S. Cl.
CPC .............. *H01P 5/18* (2013.01); *H04B 1/006* (2013.01); *H04B 1/0064* (2013.01);
(Continued)

(58) Field of Classification Search
CPC ......... H01P 5/18; H04B 1/006; H04B 1/0064; H04B 1/48
(Continued)

(56) References Cited

U.S. PATENT DOCUMENTS 3,611,199 A    10/1971 Safran
3,868,594 A    2/1975  Cornwell et al.
(Continued)

FOREIGN PATENT DOCUMENTS

| EP | 2503701 A2 | 9/2012 |
| JP | S62-159502 A | 7/1987 |
| JP | H01274502 A | 11/1989 |
| JP | H08505750 A | 6/1996 |
| JP | 2000-077915 A | 3/2000 |

(Continued)

OTHER PUBLICATIONS

Chen at al., "A High-Directivity Microstrip Directional Coupler With Feedback Compensation", 2002 IEEE MTT-S International Microwave Symposium Digest, issued in 2002, pp. 101-104.
(Continued)

*Primary Examiner* — Dean O Takaoka
(74) *Attorney, Agent, or Firm* — Lando & Anastasi, LLP

(57) ABSTRACT

A coupling methodology and circuit arrangements to provide multi-frequency simultaneous power measurement. In one example, a wireless device front-end apparatus includes a plurality of antenna swap switches each connected to first and second antenna contacts, and a plurality of electromagnetic couplers each having an input port to receive a input signal of a unique frequency, a coupled port that provides a coupled signal based on the input signal, an output port connected to one of the plurality of antenna swap switches, and an isolation port. The apparatus further includes a termination network including a plurality of termination loads, and an output switch network configured to selec-
(Continued)

tively connect the coupled port of each electromagnetic coupler to a coupler output bank to provide the coupled signals at the coupler output bank, and to selectively connect the isolation port of each electromagnetic coupler to one of the plurality of termination loads.

20 Claims, 10 Drawing Sheets

Related U.S. Application Data

(60) Provisional application No. 62/353,349, filed on Jun. 22, 2016.

(51) Int. Cl.
*H04B 1/00* (2006.01)
*H04L 5/00* (2006.01)
*H04L 5/14* (2006.01)

(52) U.S. Cl.
CPC .......... *H04L 5/0023* (2013.01); *H04L 5/1461* (2013.01); *H04L 5/001* (2013.01)

(58) Field of Classification Search
USPC ........................................................ 333/116
See application file for complete search history.

(56) References Cited

U.S. PATENT DOCUMENTS

| | | |
|---|---|---|
| 4,460,875 A | 7/1984 | Harman |
| 4,677,399 A | 6/1987 | Le Dain et al. |
| 4,764,740 A | 8/1988 | Meyer |
| 5,038,112 A | 8/1991 | O'Neill |
| 5,222,246 A | 6/1993 | Wolkstein |
| 5,276,411 A | 1/1994 | Woodin, Jr. et al. |
| 5,363,071 A | 11/1994 | Schwent et al. |
| 5,487,184 A | 1/1996 | Nagode |
| 5,625,328 A | 4/1997 | Coleman, Jr. |
| 5,745,016 A | 4/1998 | Salminen |
| 5,767,753 A | 6/1998 | Ruelke |
| 5,903,820 A | 5/1999 | Hagstrom |
| 6,020,795 A | 2/2000 | Kim |
| 6,078,299 A | 6/2000 | Scharfe, Jr. |
| 6,108,527 A | 8/2000 | Urban et al. |
| 6,329,880 B2 | 12/2001 | Akiya |
| 6,496,708 B1 | 12/2002 | Chan et al. |
| 6,559,740 B1 | 5/2003 | Schulz et al. |
| 6,771,141 B2 | 8/2004 | Iida et al. |
| 6,803,818 B2 | 10/2004 | van Amerom |
| 6,972,640 B2 | 12/2005 | Nagamori et al. |
| 7,042,309 B2 | 5/2006 | Podell |
| 7,224,244 B2 | 5/2007 | Drapac et al. |
| 7,230,316 B2 | 6/2007 | Yamazaki et al. |
| 7,236,069 B2 | 6/2007 | Puoskari |
| 7,305,223 B2 | 12/2007 | Liu et al. |
| 7,319,370 B2 | 1/2008 | Napijalo |
| 7,336,142 B2 | 2/2008 | Vogel |
| 7,493,093 B2 | 2/2009 | Boerman et al. |
| 7,538,635 B2 | 5/2009 | Fukuda et al. |
| 7,546,089 B2 | 6/2009 | Bellantoni |
| 7,966,140 B1 | 6/2011 | Gholson, III et al. |
| 7,973,358 B2 | 7/2011 | Hanke et al. |
| 8,115,234 B2 | 2/2012 | Nakajima et al. |
| 8,175,554 B2 | 5/2012 | Camuffo et al. |
| 8,248,302 B2 | 8/2012 | Tsai et al. |
| 8,289,102 B2 | 10/2012 | Yamamoto et al. |
| 8,315,576 B2 | 11/2012 | Jones |
| 8,334,580 B2 | 12/2012 | Sakurai et al. |
| 8,417,196 B2 | 4/2013 | Kitching et al. |
| 8,526,890 B1 | 9/2013 | Chien et al. |
| 8,606,198 B1 | 12/2013 | Wright |
| 8,633,761 B2 | 1/2014 | Lee |
| 8,761,026 B1 | 6/2014 | Berry et al. |
| 8,810,331 B2 | 8/2014 | Gu et al. |
| 9,014,647 B2 | 4/2015 | Kitching et al. |
| 9,214,967 B2 | 12/2015 | Reisner et al. |
| 9,225,382 B2 | 12/2015 | Khlat |
| 9,356,330 B1 | 5/2016 | Donoghue et al. |
| 9,425,835 B2 | 8/2016 | Seckin et al. |
| 9,496,902 B2 | 11/2016 | Srirattana et al. |
| 9,553,617 B2 | 1/2017 | Srirattana et al. |
| 9,634,371 B2 | 4/2017 | Swarup et al. |
| 9,647,314 B1 | 5/2017 | Nguyen et al. |
| 9,748,627 B2 | 8/2017 | Sun et al. |
| 9,755,670 B2 | 9/2017 | Chen et al. |
| 10,403,955 B2 * | 9/2019 | Srirattana ................ H01P 5/18 |
| 2002/0097100 A1 | 7/2002 | Woods et al. |
| 2002/0113601 A1 | 8/2002 | Swank |
| 2002/0113666 A1 | 8/2002 | Yamazaki et al. |
| 2002/0139975 A1 | 10/2002 | Lewis et al. |
| 2003/0214365 A1 | 11/2003 | Adar et al. |
| 2004/0127178 A1 | 7/2004 | Kuffner |
| 2004/0201526 A1 | 10/2004 | Knowles et al. |
| 2005/0017821 A1 | 1/2005 | Sawicki |
| 2005/0040912 A1 | 2/2005 | Pelz |
| 2005/0146394 A1 | 7/2005 | Podell |
| 2005/0170794 A1 | 8/2005 | Koukkari et al. |
| 2005/0239421 A1 | 10/2005 | Kim et al. |
| 2006/0232359 A1 | 10/2006 | Fukuda et al. |
| 2007/0082642 A1 | 4/2007 | Hattori |
| 2007/0159268 A1 | 7/2007 | Podell |
| 2008/0036554 A1 | 2/2008 | Krausse et al. |
| 2008/0055187 A1 | 3/2008 | Tamura et al. |
| 2008/0056638 A1 | 3/2008 | Glebov et al. |
| 2008/0070519 A1 | 3/2008 | Okabe |
| 2008/0112466 A1 | 5/2008 | Sasaki |
| 2009/0134953 A1 | 5/2009 | Hunt et al. |
| 2009/0195335 A1 | 8/2009 | Wahl et al. |
| 2009/0278624 A1 | 11/2009 | Tsai et al. |
| 2009/0280755 A1 | 11/2009 | Camuffo et al. |
| 2009/0322313 A1 | 12/2009 | Zhang et al. |
| 2011/0057746 A1 | 3/2011 | Yamamoto et al. |
| 2011/0063044 A1 | 3/2011 | Jones |
| 2011/0148548 A1 | 6/2011 | Uhm et al. |
| 2011/0199166 A1 | 8/2011 | Carrillo-Ramirez |
| 2011/0254637 A1 | 10/2011 | Manssen et al. |
| 2011/0255575 A1 | 10/2011 | Zhu et al. |
| 2011/0279192 A1 | 11/2011 | Nash et al. |
| 2011/0298559 A1 | 12/2011 | Kitching et al. |
| 2012/0019332 A1 | 1/2012 | Hino et al. |
| 2012/0019335 A1 | 1/2012 | Hoang et al. |
| 2012/0062333 A1 | 3/2012 | Ezzeddine et al. |
| 2012/0071123 A1 | 3/2012 | Jones et al. |
| 2012/0195351 A1 | 8/2012 | Banwell et al. |
| 2012/0243579 A1 | 9/2012 | Premakanthan et al. |
| 2013/0005284 A1 | 1/2013 | Dalipi |
| 2013/0113575 A1 | 5/2013 | Easter |
| 2013/0194054 A1 | 8/2013 | Presti |
| 2013/0207741 A1 | 8/2013 | Presti |
| 2013/0241668 A1 | 9/2013 | Tokuda et al. |
| 2013/0293316 A1 | 11/2013 | Kitching et al. |
| 2013/0307635 A1 | 11/2013 | Kase et al. |
| 2014/0152253 A1 | 6/2014 | Ozaki et al. |
| 2014/0213201 A1 | 7/2014 | Reisner et al. |
| 2014/0227982 A1 | 8/2014 | Granger-Jones et al. |
| 2014/0266499 A1 | 9/2014 | Noe |
| 2014/0368293 A1 | 12/2014 | Mukaiyama |
| 2015/0002239 A1 | 1/2015 | Tanaka |
| 2015/0042412 A1 | 2/2015 | Imbornone et al. |
| 2015/0043669 A1 | 2/2015 | Ella et al. |
| 2015/0048910 A1 | 2/2015 | LaFountain et al. |
| 2015/0072632 A1 | 3/2015 | Pourkhaatoun et al. |
| 2015/0091668 A1 | 4/2015 | Solomko et al. |
| 2015/0200437 A1 | 7/2015 | Solomko et al. |
| 2015/0249485 A1 | 9/2015 | Ouyang et al. |
| 2015/0270821 A1 | 9/2015 | Natarajan et al. |
| 2015/0326202 A1 | 11/2015 | Nicholls et al. |
| 2015/0349742 A1 | 12/2015 | Chen et al. |
| 2015/0372366 A1 | 12/2015 | Frye |
| 2016/0025928 A1 | 1/2016 | Onawa |
| 2016/0028147 A1 | 1/2016 | Srirattana et al. |
| 2016/0028420 A1 | 1/2016 | Srirattana et al. |

(56) References Cited

U.S. PATENT DOCUMENTS

| | | |
|---|---|---|
| 2016/0043458 A1 | 2/2016 | Sun et al. |
| 2016/0065167 A1 | 3/2016 | Granger-Jones et al. |
| 2016/0079649 A1 | 3/2016 | Ilkov et al. |
| 2016/0079650 A1 | 3/2016 | Solomko et al. |
| 2016/0172737 A1 | 6/2016 | Srirattana et al. |
| 2016/0172738 A1 | 6/2016 | Srirattana et al. |
| 2016/0172739 A1 | 6/2016 | Srirattana et al. |
| 2016/0172740 A1 | 6/2016 | Srirattana et al. |
| 2016/0268994 A1 | 9/2016 | Granger-Jones et al. |
| 2016/0344430 A1 | 11/2016 | Srirattana et al. |
| 2016/0344431 A1 | 11/2016 | Srirattana et al. |
| 2016/0373146 A1 | 12/2016 | Manssen et al. |
| 2017/0026020 A1 | 1/2017 | Solomko et al. |
| 2017/0033428 A1 | 2/2017 | Ootsuka et al. |
| 2017/0063425 A1 | 3/2017 | Khlat et al. |
| 2017/0085245 A1 | 3/2017 | Srirattana et al. |
| 2017/0141802 A1 | 5/2017 | Solomko et al. |

FOREIGN PATENT DOCUMENTS

| | | |
|---|---|---|
| JP | 2001127664 A | 5/2001 |
| JP | 2011040978 A | 2/2011 |
| JP | 2013126067 A | 6/2013 |
| KR | 20040037465 A | 5/2004 |
| KR | 20110118289 A | 10/2011 |
| KR | 20120007790 A | 1/2012 |
| WO | 2005018451 A1 | 3/2005 |
| WO | 2015020927 A2 | 2/2015 |
| WO | 2015134979 A1 | 9/2015 |

OTHER PUBLICATIONS

International Search Report and Written Opinion from corresponding International Application No. PCT/US2017/038433 dated Oct. 13, 2017.

* cited by examiner

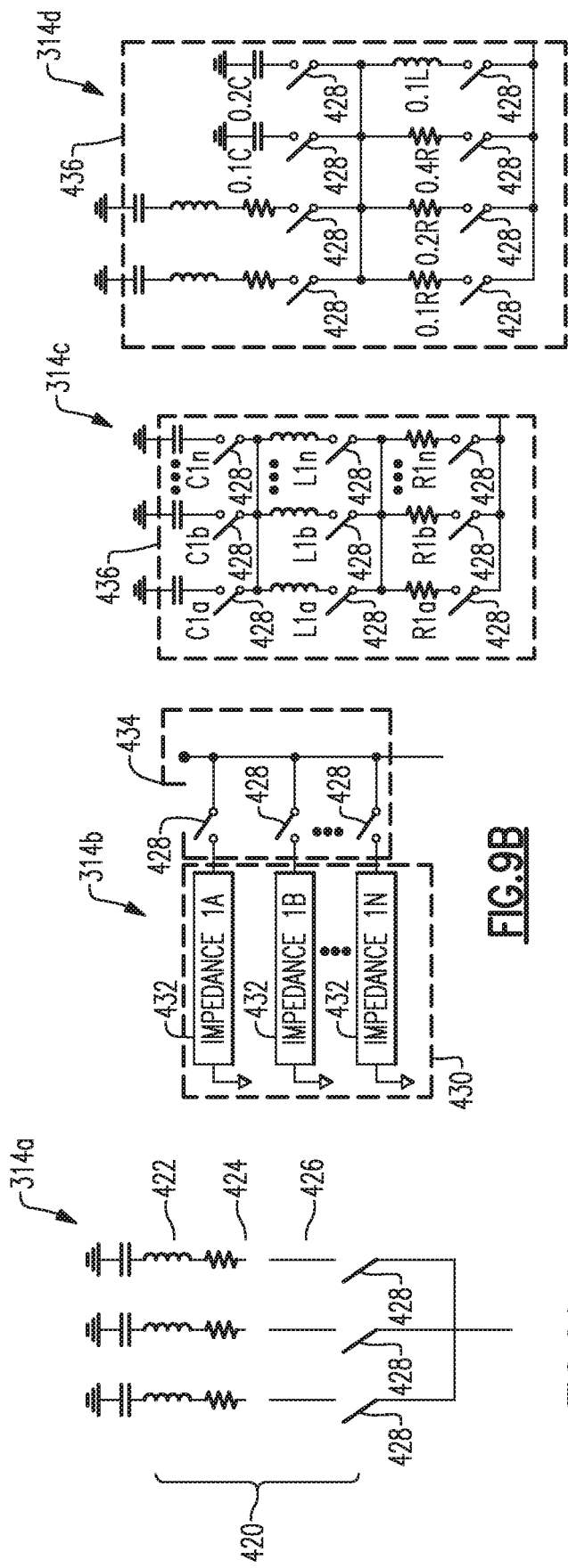

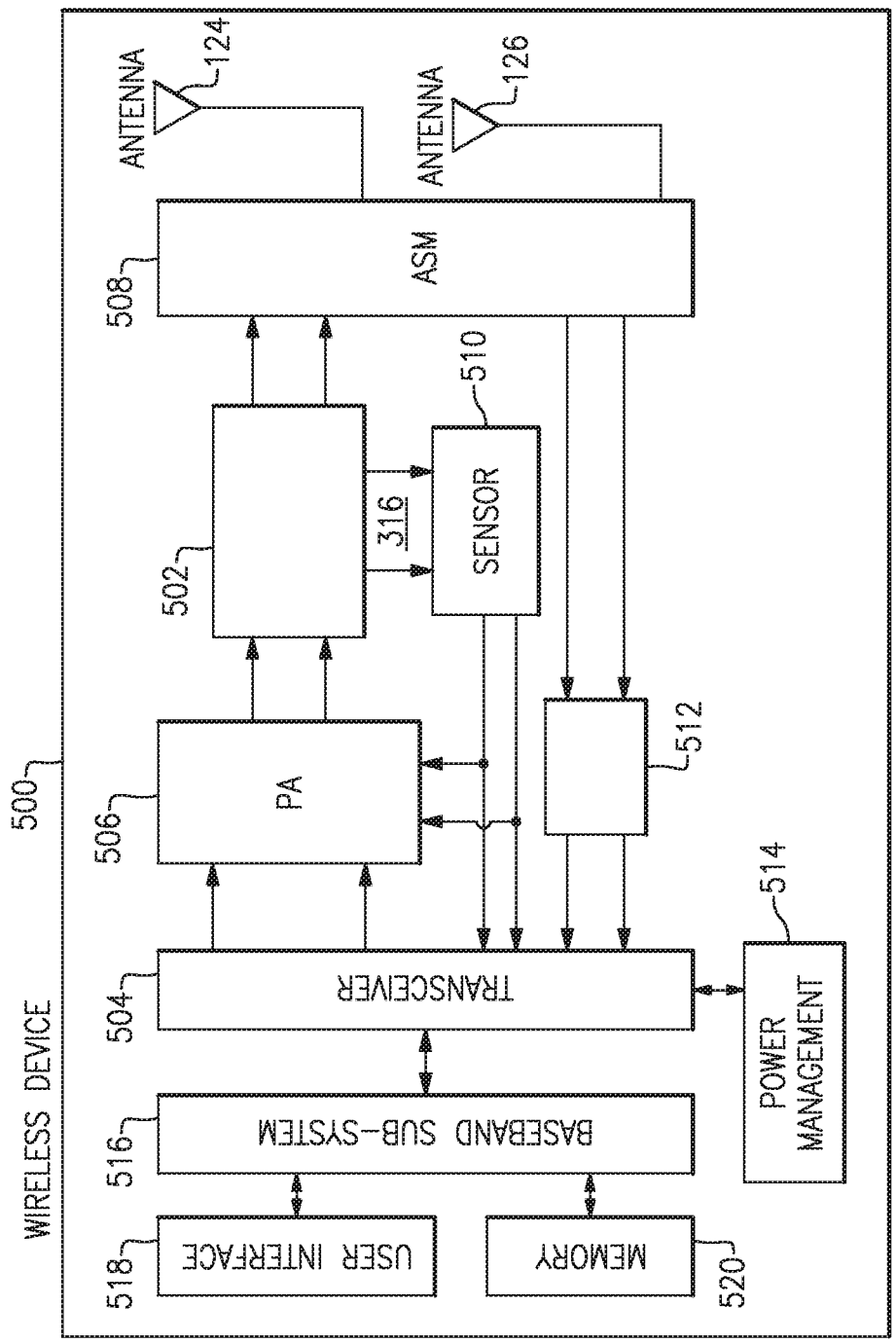

ELECTROMAGNETIC COUPLER ARRANGEMENTS FOR MULTI-FREQUENCY POWER DETECTION, AND DEVICES INCLUDING SAME

CROSS-REFERENCE TO RELATED APPLICATIONS

This application claims the benefit under 35 U.S.C. § 120 of co-pending U.S. patent application Ser. No. 15/628,749 filed on Jun. 21, 2017 and titled "ELECTROMAGNETIC COUPLER ARRANGEMENTS FOR MULTI-FREQUENCY POWER DETECTION, AND DEVICES INCLUDING SAME," which claims the benefit under 35 U.S.C. § 119(e) and PCT Article 8 of U.S. Provisional Application No. 62/353,349 filed on Jun. 22, 2016 and titled "ELECTROMAGNETIC COUPLER ARRANGEMENTS FOR MULTI-FREQUENCY POWER DETECTION, AND DEVICES INCLUDING SAME," each of which is herein incorporated by reference in its entirety for all purposes.

BACKGROUND

Electromagnetic couplers, such as radio frequency (RF) couplers are used in a variety of applications to extract a signal for measurement, monitoring, or other uses. For example, an RF coupler can be included in a signal path between an RF source and a load (such as an antenna) to provide an indication of forward RF power of the RF signal traveling from the RF source to the load and/or an indication of reverse RF power reflected back from the load. RF couplers include, for example, directional couplers, bi-directional couplers, multi-band couplers (e.g., dual band couplers), and the like. An RF coupler typically has a coupled port, an isolation port, a power input port, and a power output port. When a termination impedance is presented to the isolation port, an indication of forward RF power traveling from the power input port to the power output port is provided at the coupled port. When a termination impedance is presented to the coupled port, an indication of reverse (e.g., reflected) RF power traveling from the power output port to the power input port is provided at the isolation port. The termination impedance is typically implemented by a 50 Ohm shunt resistor in a variety of conventional RF couplers.

SUMMARY OF INVENTION

Aspects and embodiments relate to electronic systems and, in particular, to electronic systems and devices incorporating electromagnetic couplers, such as radio frequency (RF) couplers, for example. In particular, aspects and embodiments are directed to a coupling schema to accommodate simultaneous power measurement at multiple frequencies or in multiple frequency bands.

According to one embodiment, a multi-frequency electromagnetic coupler module includes a plurality of bi-directional electromagnetic couplers, each configured to individually receive and couple a respective single one of a corresponding plurality of input signals of different frequencies to provide a coupled signal representative of a power level of the respective input signal, a termination network including a plurality of termination loads, and a coupler switch network configured to selectively connect ones of the plurality of termination loads to forward or reverse coupled ports of the plurality of bi-directional electromagnetic couplers and to selectively and alternately connect the forward or reverse coupled ports of the plurality of bi-directional electromagnetic couplers to a coupler output interface to provide the coupled signals at the coupler output interface. The coupler module can be connected to antenna swap switches to multiplex the plurality of input signals among two or more antennas for transmission. As discussed in more detail below, examples of the coupler module provide for power detection at multiple frequencies simultaneously without requiring filters or other frequency selective components in the coupled path, and may relax the linearity requirement for the antenna swap switches by ensuring that multiple signals at different frequencies are not provided to the same input port of the antenna swap switches at the same time.

Another embodiment is directed to a wireless device front-end apparatus configured for multi-frequency operation using a plurality of antennas and having an antenna swap architecture. The apparatus may comprise an antenna switch module having first and second antenna contacts for connecting to first and second antennas, respectively, and including a plurality of antenna swap switches each connected to the first and second antenna contacts, and a coupler assembly including a plurality of electromagnetic couplers each having an input port configured to receive a input signal of a unique frequency, a coupled port, an output port connected to one of the plurality of antenna swap switches, and an isolation port, each electromagnetic coupler being configured to provide a coupled signal at the coupled port responsive to receiving the input signal at the input port. The apparatus may further comprise a termination network including a plurality of termination loads, and an output switch network configured to selectively connect the coupled ports of each of the plurality of electromagnetic couplers to a coupler output bank to provide the coupled signals at the coupler output bank, and to selectively connect the isolation ports of each of the plurality of electromagnetic couplers to one of the plurality of termination loads.

In one example the coupler output bank includes a number of coupler output contacts corresponding to half the plurality of electromagnetic couplers.

In one example each of the plurality of antenna swap switches is a double-pole double throw switch and is connected to two of the plurality of electromagnetic couplers.

In another example the plurality of electromagnetic couplers includes at least four electromagnetic couplers, two of the at least four electromagnetic couplers being configured to receive input signals in a first frequency band, and another two of the at least four electromagnetic couplers being configured to receive input signals in a second frequency band higher than the first frequency band, the first and second frequency bands being non-overlapping in frequency. The antenna switch module may further include a first diplexer connected between the plurality of antenna swap switches and the first antenna contact, and a second diplexer connected between the plurality of antenna swap switches and the second antenna contact.

In another example the plurality of electromagnetic couplers further includes an additional pair of electromagnetic couplers configured to receive input signals in a third frequency band different from the first and second frequency bands. The antenna switch module further includes a first triplexer connected between the plurality of antenna swap switches and the first antenna contact, and a second triplexer connected between the plurality of antenna swap switches and the second antenna contact.

In one example each termination load of the plurality of termination loads has an adjustable impedance.

In another example each of the plurality of electromagnetic couplers is bi-directional, and the output switch network is further configured to switch operation of the plurality of electromagnetic couplers between a forward power detection mode and a reverse power detection mode.

According to another embodiment wireless device front-end apparatus is configured for multi-frequency operation using a plurality of antennas and having an antenna swap architecture. The apparatus may comprise an antenna switch module having first and second antenna contacts for connecting to first and second antennas, respectively, and including a first antenna swap switch connected to the first and second antenna contacts and a second antenna swap switch connected to the first and second antenna contacts, the first and second antenna swap switches being double-pole double-throw switches. The apparatus may further comprise a first electromagnetic coupler having a first input port configured to receive a first input signal, a first coupled port configured to provide a first coupled signal responsive to receiving the first input signal at the first input port, a first output port connected to the first antenna swap switch, and a first isolation port, a second electromagnetic coupler having a second input port configured to receive a second input signal, a second coupled port configured to provide a second coupled signal responsive to receiving the second input signal at the second input port, a second output port connected to the second antenna swap switch, and a second isolation port, a third electromagnetic coupler having a third input port configured to receive a third input signal, a third coupled port configured to provide a third coupled signal responsive to receiving the third input signal at the third input port, a third output port connected to the first antenna swap switch, and a third isolation port, and a fourth electromagnetic coupler having a fourth input port configured to receive a fourth input signal, a fourth coupled port configured to provide a fourth coupled signal responsive to receiving the fourth input signal at the fourth input port, a fourth output port connected to the second antenna swap switch, and a fourth isolation port, the first, second, third, and fourth input signals having different frequencies. The apparatus may further comprise a termination network including a first termination load, a second termination load, a third termination load, and a fourth termination load, and an output switch network configured to selectively connect the first and second coupled ports to a first coupler output contact to provide the first and second coupled signals at the first coupler output contact, to selectively connect the third and fourth coupled ports to a second coupler output contact to provide the third and fourth coupled signals at the second coupler output contact, and to selectively connect the first termination load to the first isolation port, the second termination load to the second isolation port, the third termination load to the third isolation port, and the fourth termination load to the fourth isolation port.

In one example the first, second, third, and fourth termination loads are adjustable. In another example each of the first, second, third, and fourth termination loads includes a plurality of switchable passive impedance elements, the plurality of switchable passive impedance elements including at least one resistive element and one or more capacitive or inductive elements.

In one example each of the first, second, third, and fourth electromagnetic couplers is bi-directional, and wherein the output switch network is further configured to switch operation of the first, second, third, and fourth electromagnetic couplers between a forward power detection mode and a reverse power detection mode.

In another example the antenna switch module further includes a first diplexer connected between the first and second antenna swap switches and the first antenna contact, and a second diplexer connected between the first and second antenna switches and the second antenna contact.

In another example the first and second input signals are within a first frequency band, the third and fourth input signals are within a second frequency band higher than the first frequency band, and the first and second frequency bands do not overlap in frequency. In another example the antenna switch module further includes a third antenna swap switch connected to the first and second antenna contacts. The apparatus may further comprise a fifth electromagnetic coupler having a fifth input port configured to receive a fifth input signal, a fifth coupled port configured to provide a fifth coupled signal responsive to receiving the fifth input signal at the fifth input port, a fifth output port connected to the third antenna swap switch, and a fifth isolation port, and a sixth electromagnetic coupler having a sixth input port configured to receive a sixth input signal, a sixth coupled configured to provide a sixth coupled signal responsive to receiving the sixth input signal at the sixth input port, a sixth output port connected to the third antenna swap switch, and a sixth isolation port, the fifth and sixth input signals being in a third frequency band different from the first and second frequency bands. In one example the termination network further includes a fifth termination load and a sixth termination load, and the output switch network is further configured to selectively connect the fifth coupled port to a third coupler output contact, to selectively connect the fifth termination load to the fifth isolation port, to selectively connect the sixth coupled port to the third coupler output contact, and to selectively connect the sixth termination load to the sixth isolation port. The antenna switch module may further include a first triplexer connected between the first, second, and third antenna swap switches and the first antenna contact, and a second triplexer connected between the first, second, and third antenna switches and the second antenna contact.

According to another embodiment a wireless device comprises first and second antennas, an antenna switch module having first and second antenna contacts connected to the first and second antennas, respectively, and including a plurality of antenna swap switches each connected to the first and second antenna contacts, and a plurality of electromagnetic couplers each having an input port configured to receive an input signal of a unique frequency, a coupled port, an output port connected to one of the plurality of antenna swap switches, and an isolation port, each electromagnetic coupler being configured to provide a coupled signal at the coupled port responsive to receiving the input signal at the input port. The wireless device further comprises a termination network including a plurality of termination loads, an output switch network configured to selectively connect the coupled ports of each of the plurality of electromagnetic couplers to a coupler output bank to provide the coupled signals at the coupler output bank, and to selectively connect the isolation ports of each of the plurality of electromagnetic couplers to one of the plurality of termination loads, a transceiver configured to produce the input signals, and a power amplifier module connected between the transceiver and the plurality of electromagnetic couplers and configured to receive and amplify the input signals.

In one example the wireless device further comprises a sensor module coupled to the coupler output bank and configured to receive and process the coupled signals.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 9A is a diagram of one example of an adjustable termination load for an electromagnetic coupler;

FIG. 9B is a diagram of another example of an adjustable termination load for an electromagnetic coupler;

FIG. 9C is a diagram of another example of an adjustable termination load for an electromagnetic coupler;

FIG. 9D is a diagram of another example of an adjustable termination load for an electromagnetic coupler; and FIG. 10 is a block diagram of one example of a wireless device including a multi-output electromagnetic coupler.

DETAILED DESCRIPTION

Figure 1:
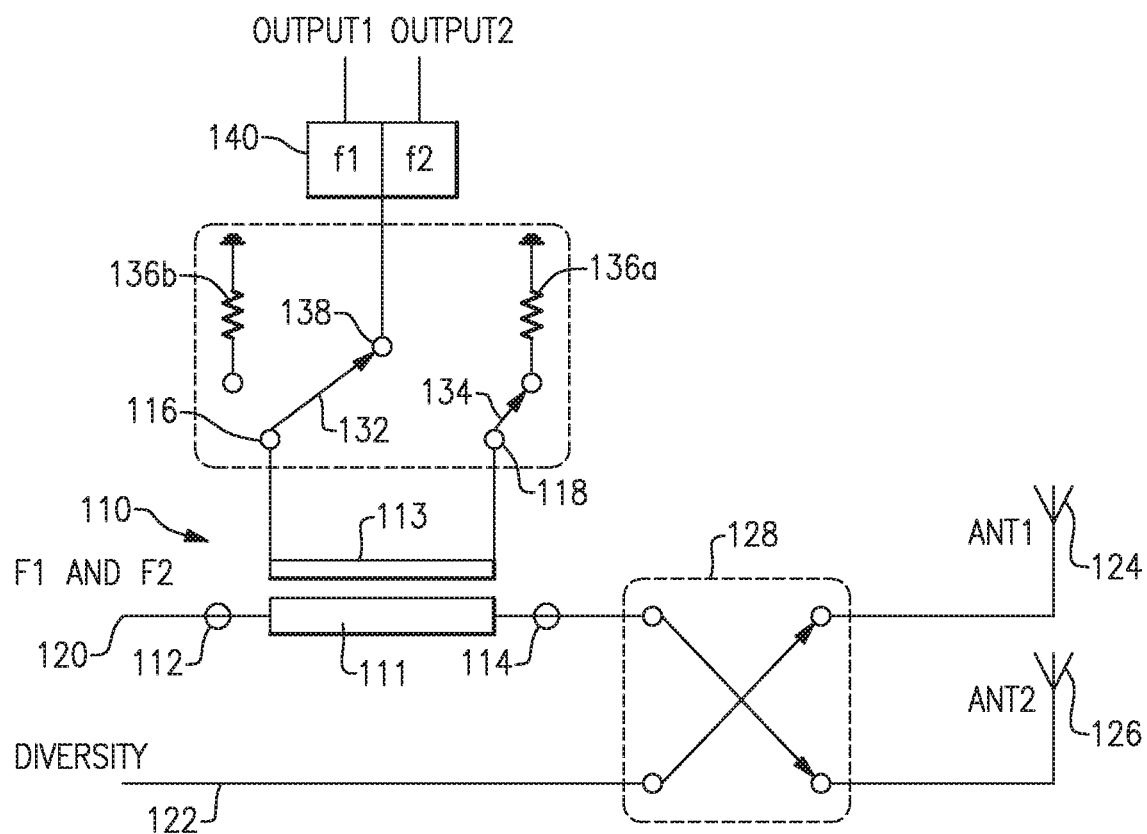
FIG. 1 is a block diagram of one example of a portion of an electronic system including a multi-output electromagnetic coupler.

Many modern communications devices, including mobile phones for example, are multi-band devices that transmit or receive signals in different bands simultaneously or where there are multiple simultaneous carrier frequencies within the same band. New mobile phone standards are emerging for receiving and/or transmitting data on multiple carrier frequencies simultaneously. In mobile phone applications, the ability to accurately monitor and control signal power can be critical. Accordingly, it may be desirable to use electromagnetic couplers to measure the signal power at the various different carrier frequencies. However, the simultaneous presence of two (or more) signals can cause interference problems when the coupler is used to attempt to measure the power of only one signal. In particular, the measurements of the forward or reverse power of one transmit signal can be contaminated by other signals, which may be present due to additional transmit signals in operation, e.g., from the same power amplifier or to the same antenna in a forward direction, or by a combination of received signals and/or reflected signals from an antenna in the reverse direction. One specific application where a solution to this problem is directly applicable is that of LTE-Advanced Uplink Carrier Aggregation Radio Access Technology used in cellular handsets, for example.

There are several approaches to measuring multiple frequencies in a system using one or more electromagnetic couplers. For example, referring to FIG. 1 there is illustrated an example of a portion of a wireless communications device in which a four-port electromagnetic coupler 110 is included in the signal path 120 and can be used to measure signal power. In the example shown in FIG. 1, the system includes a first signal path 120 in which the electromagnetic coupler 110 is connected, and a second signal path 122, also referred to as a "diversity" path, along with first and second antennas 124, 126 and an "antenna swap" switch 128 that selectively connects either signal path to either antenna. The use of two antennas 124 and 126 with the antenna swap switch 128 allows for dynamic selection of the best antenna for transmission or diversity in the receiver.

The electromagnetic coupler 110 has main transmission line 111 extending between an input port 112 and an output port 114, and a coupled line 113 extending between a coupled port 116 and an isolation port 118. In the illustrated example, the electromagnetic coupler 110 is a bi-directional coupler and a pair of mode-select switches 132, 134 is used to configure the electromagnetic coupler between a forward power detection mode and a reverse power detection mode. In the forward power detection mode, when the mode-select switches are actuated to connect the isolation port 118 to a termination load 136a and to connect the coupled port 116 to a coupler output contact 138 (as shown in FIG. 1), the electromagnetic coupler is configured to provide at the coupled output contact 138 a coupled signal that is representative of the signal power of an input signal received at the input port 112. Similarly, when configured for reverse power detection, the mode-select switches 132 and 134 are reversed so as to connect the coupled port 116 to a termination load 136b (the coupled port 116 acts a reverse isolation port) and to connect the isolation port 118 (acting as a reverse coupled port) to the coupler output contact 138. In this mode, the electromagnetic coupler 110 provides at the coupler output contact 138 an indication of the signal power either reflected or received at the output port 114.

As shown in FIG. 1, in certain instances the signals on the signal path 120 include multiple input frequencies or frequency bands. In the illustrated example, there are two input frequencies, namely F1 and F2; however, those skilled in the art will readily appreciate that there may be more than two input frequencies and that the structures and methods disclosed herein may be readily modified to accommodate more or fewer input frequencies. As used herein, the term "input frequency" is intended to refer to an RF signal comprised of a single carrier frequency or "tone" or to an RF signal having a certain, typically relatively narrow, bandwidth covering a range of frequencies.

In examples such as that shown in FIG. 1 where multiple input frequencies are present on the signal path 120 simultaneously, multiple coupled signals will also be present simultaneously at the coupler output contact 138. Thus, there is a need for frequency selective components in the coupled path so as to be able to differentiate between the coupled signals of different frequencies and provide accurate power measurements of each individual input frequency. Accordingly, as shown in FIG. 1, the system may include a filter bank 140 connected to the coupler output contact 138 that allows the electromagnetic coupler 110 to provide multiple outputs, in this case "Output 1" corresponding to a measurement of the signal power of the first input frequency F1 and "Output 2" corresponding to a measurement of the signal power of the second input frequency F2. Thus, the filter bank in this example includes two filters, one having a passband f1 that passes the first input frequency F1 and blocks the second input frequency F2, and another having a passband f2 that passes the second input frequency F2 and blocks the first input frequency F1. Typically, there is a need for such a filter bank 140 to have approximately 30 dB of isolation between f1 and f2. This requirement for high isolation between the different frequencies can present significant challenges in the filter design.

Directivity of an electromagnetic coupler is dependent on the termination impedance at the isolation port. In a bi-directional electromagnetic coupler, when the forward coupled port is configured for the coupled mode, the reverse coupled port is terminated with an impedance that is selected to provide highest directivity for the forward coupled port, and vice versa. Similarly, the coupling factor of an electromagnetic coupler is frequency-dependent. The coupling factor for a given electromagnetic coupler is a logarithmic function of frequency (proportional to frequency) and is dependent on the physical structure of the coupler. For example, the coupling factor is dependent on the line widths and lengths of the coupler and on the manner in which the main line and coupled line are designed to be capacitively and inductively coupled to one another. Accordingly, to detect power at multiple different frequencies simultaneously, certain embodiments provide for adjustability in the termination impedance(s) or coupler structure, or use multiple couplers, each optimized for a particular input frequency, as discussed further below.

Various arrangements can be implemented to tune and adjust electromagnetic couplers to optimize power detection at multiple different input frequencies simultaneously. For example, certain configurable electromagnetic couplers use multiple coupled lines in conjunction with RF switches to form switched coupled line networks to allow for optimization of a multi-output coupler having a desired coupling factor and directivity in the frequency bands of interest. In such systems, the length or width of each coupled line, or the spacing of each coupled line relative to the main coupled line, can be varied from one coupled line section to another to optimize each section for a particular input frequency. In addition, adjustable termination loads can be used to optimize the directivity of the different couplers formed by the multiple coupled lines for a particular input frequency. These types of coupler arrangements can provide a highly flexible coupling schema that can be tuned and optimized for coupling and detection of multiple input frequencies simultaneously. However, because multiple input frequencies can still be present simultaneously on the common main transmission line, frequency selective components are used on the coupled paths to separate the various frequencies from one another in order to be able to accurately measure the power level associated with each individual input frequency. As a result, these systems can be subject to performance limitations resulting from switch non-linearity and the need for frequency selective components in the coupled path. As discussed above, in order to achieve desired accuracy in the power detection measurements, relatively high isolation between the frequency selective components is needed. It can be challenging to design and implement filters having such high levels of isolation, e.g., ~30 dB, particularly where one input frequency may be relatively close to another.

In addition, referring again to FIG. 1, the presence of multiple input frequencies on the signal path 120 at the same time may lead to a requirement that the antenna swap switch 128 have very good linearity in order to avoid significant degradation in performance due to signal distortion and interference. This problem is illustrated with reference to FIG. 2.

Figure 2:
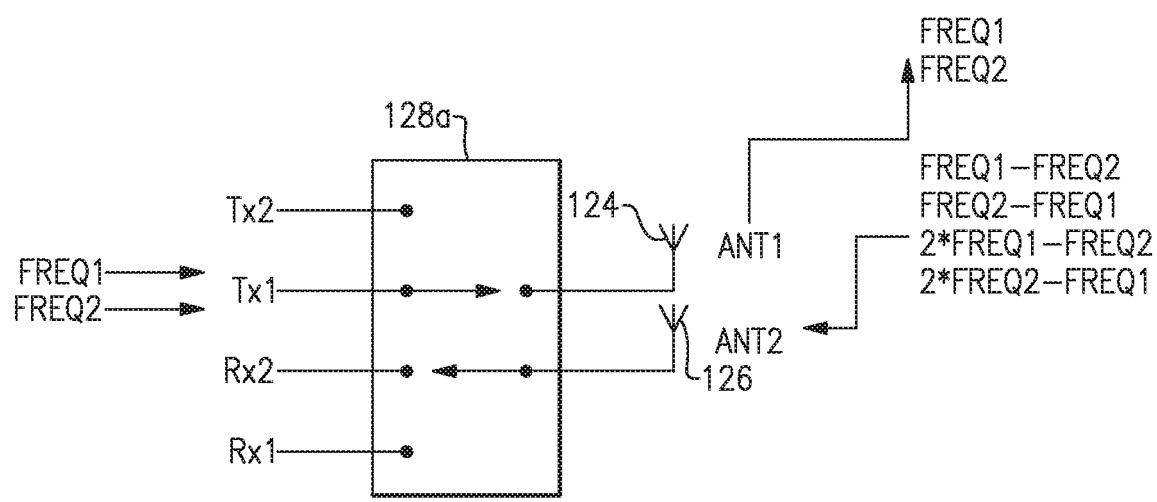
FIG. 2 is a block diagram of one example of an antenna swap switch illustrating generation of intermodulation distortion products.

Referring to FIG. 2 there is illustrated an example of an antenna swap switch 128a configured to switch transmission (Tx) and receiving (Rx) paths between two antennas 124, 126. When multiple input frequencies (e.g., Freq1 and Freq2) are present simultaneously on one (or more) transmission paths (e.g., Tx1 as shown in FIG. 2) and sent through the switch 128a together, the inherent non-linear nature of the switch 128a generates intermodulation distortion (IMD) products, as shown in FIG. 2. These intermodulation distortion products, which may be second order, third order, or higher order intermodulation products, can fall into one or more intended receiver frequency band(s), resulting in desensitizing of the receiver. This can present a very challenging issue for multiple uplink frequencies being transmitted to the same antenna 124 or 126. Achieving an antenna swap switch 128 with sufficiently good linearity such that generated intermodulation products are minimal can be very difficult, if not impossible, particularly for modern wireless communications standards that have very strict performance and interference specifications.

Accordingly, although the use of a single multi-output electromagnetic coupler, as discussed above and variations thereof, may be desirable and useful in certain applications, there are other circumstances in which multi-frequency transmission through the same path (same coupler and same antenna swap or other switch) may not be desired. Certain aspects and embodiments therefore are directed to arrangements of electromagnetic coupler(s) and switches, as well as frequency multiplexing filter(s) (such as diplexers, triplexers, or quad-plexers, for example) that avoid problematic scenarios. Examples of coupling arrangements disclosed herein avoid the need for filters (or other frequency selective components) at the output port of the electromagnetic coupler and reduce the switch linearity requirement on IMD product generation by separating signals into multiple paths so that one input frequency will route through a coupler and switch port and then be combined into a common antenna through a multiplexed filter or transmitted through different antenna.

The need for filters in the coupled path can increase the cost of implementation and significantly increase the size of the design. In addition, filters limit the frequency of usage to the passband of the filter. In the case of surface acoustic wave (SAW) filters, the bandwidth of the passband may be very narrow and severely limit the usage of a given design. Aspects and embodiments provide a coupling schema that avoids these drawbacks and limitations by eliminating the use of filters in the coupled path, making the coupler(s) operable at any frequency. Furthermore, by avoiding having multiple input frequencies travelling simultaneously into the same switch port after the coupler, generation of IMD products in the switch is also avoided. As a result, the design may not need an antenna swap switch (or other switch) having extremely high linearity, which may not available. For example, for LTE applications, the linearity requirement can be as high as +94 dBm IP3, whereas current state-of-the-art double-pole-double-throw (DPDT) antenna swap switches can only achieve approximately 75 to 80 dBm IP3. With the methods and arrangements disclosed herein, existing DPDT switches can be used and achieve the performance necessary to meet IMD requirements of wireless communications standards, such as LTE, for example.

Certain embodiments include the use of multiple couplers, multiple antenna swap switches, and multiple diplexers (or other higher order multiplexing filters) to separate each input frequency into a separate path. Embodiments leverage the isolation between switches, between different antennas, and between the switch network at the coupled port to maintain the desired level of isolation to separate coupled signals at each input frequency. The separation of input frequencies into each port of the antenna swap switches reduces the requirement of linearity in the antenna swap switches, making it easier to meet system-level requirements for received sensitivity. In addition, various implementations include bi-directional couplers to allow both forward and reverse power detection, optionally in conjunction with adjustable termination loads that allow for individual optimization of the termination impedances for forward and reverse detection modes.

Figure 3:
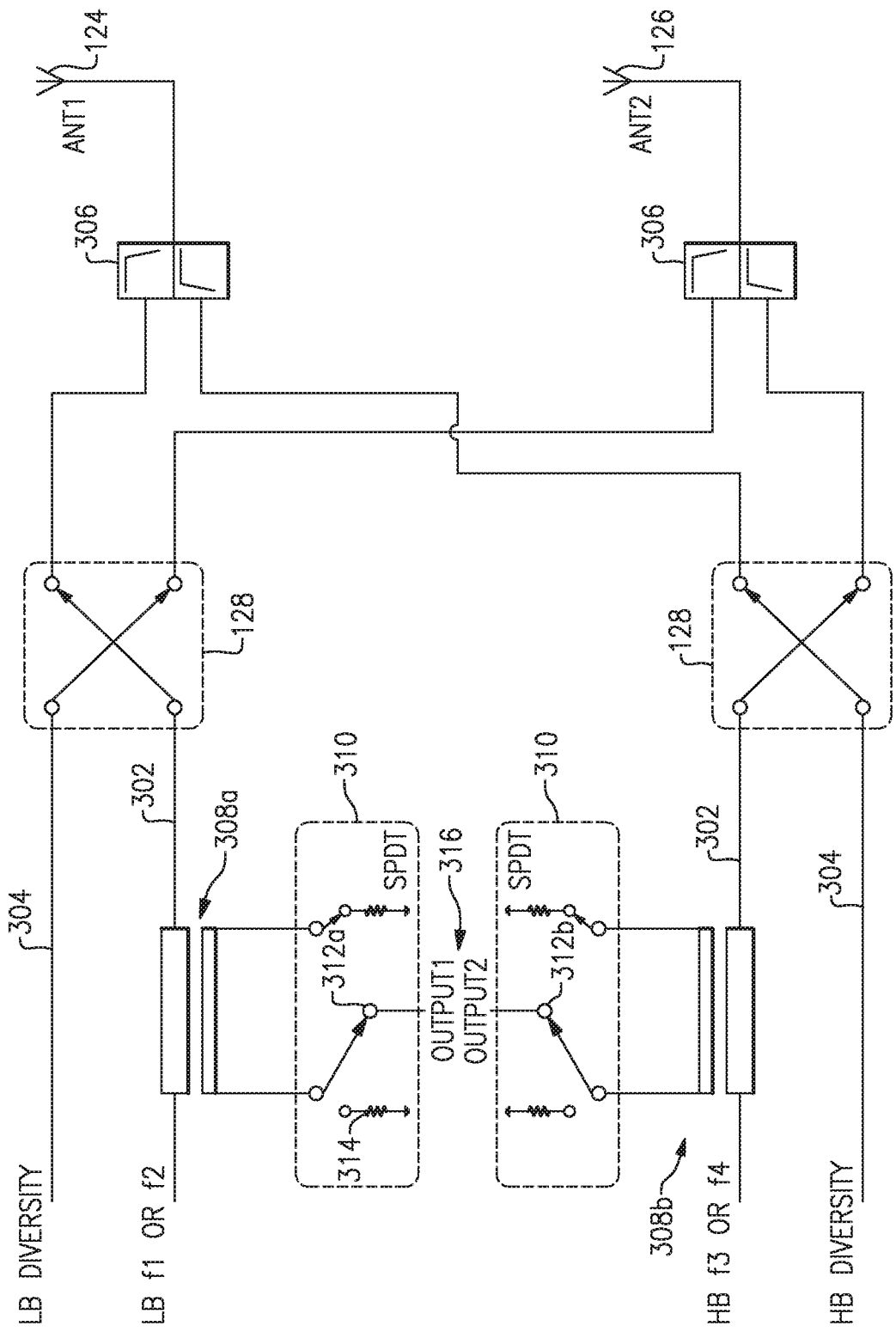
FIG. 3 is a diagram illustrating one example of a partial front-end sub-system of a wireless device configured for dual-band operation.

Referring to FIG. 3 there is illustrated an example of a partial front-end sub-system of a wireless device including a pair of antennas 124, 126, and configured for dual-band (e.g., high-band and low-band) operation. In the illustrated example, the sub-system includes a main transmission path 302 and a diversity path 304 for each of a low-band input frequency (f1 or f2) and a high-band input frequency (f3 or f4). A pair of antenna swap switches 128 multiplex the high-band and low-band signals to the two antennas 124, 126 via a pair of diplexers 306. In certain examples the diplexers 306 can be implemented using integrated passive devices, rather than surface acoustic wave devices, for example. A dedicated electromagnetic coupler 308a, 308b is connected in the main transmission path 302 of each of the low-band input frequency and the high-band input frequency, respectively, as shown. In the illustrated example, the electromagnetic couplers 308a, 308b are bi-directional and therefore each is connected to an output switch circuit 310 that allows either the forward or reverse coupled port to be connected to the coupler output contact 312a (of coupler 308a) or 312b (of coupler 308b) and the forward or reverse isolation port to be connected to a termination load 314, similar to the operation discussed above with reference to FIG. 1. In the example shown in FIG. 3, the output switch circuits 310 are shown as single-pole-double-throw (SPDT) switches; however, a variety of other switch configurations can be implemented, as will be appreciated by those skilled in the art, given the benefit of this disclosure. Thus, the coupler output 316 in this sub-system includes a low-band coupled output signal (Output1) and a high-band coupled output signal (Output2) without the need for filters in the coupled path because individual couplers 308a and 308b and transmission paths 302 are used for the low-band input frequency and the high-band input frequency.

The configuration shown in FIG. 3, and variations thereof, may provide simultaneous dual-band operation; however, some issues may arise in circumstances where more than one low-band or high-band input frequency is present at a given time. For example, referring to FIG. 4, in some circumstances there may be multiple low-band input frequencies (e.g., f1 and f2) or multiple high-band input frequencies (f3 and f4) transmitted simultaneously. In this circumstance, filters 318a and 318b are connected to the coupler output contacts 312a and 312b, respectively, to separate the multiple input frequencies within each band from one another. In addition, the presence of multiple input frequencies within a single band results in simultaneous presence of these multiple input frequencies at the same port of the antenna swap switches 128, which can result in unacceptable degradation of receiver performance due to intermodulation distortion products or a non-achievable linearity requirement for the antenna swap switch, as discussed above.

Figure 5:
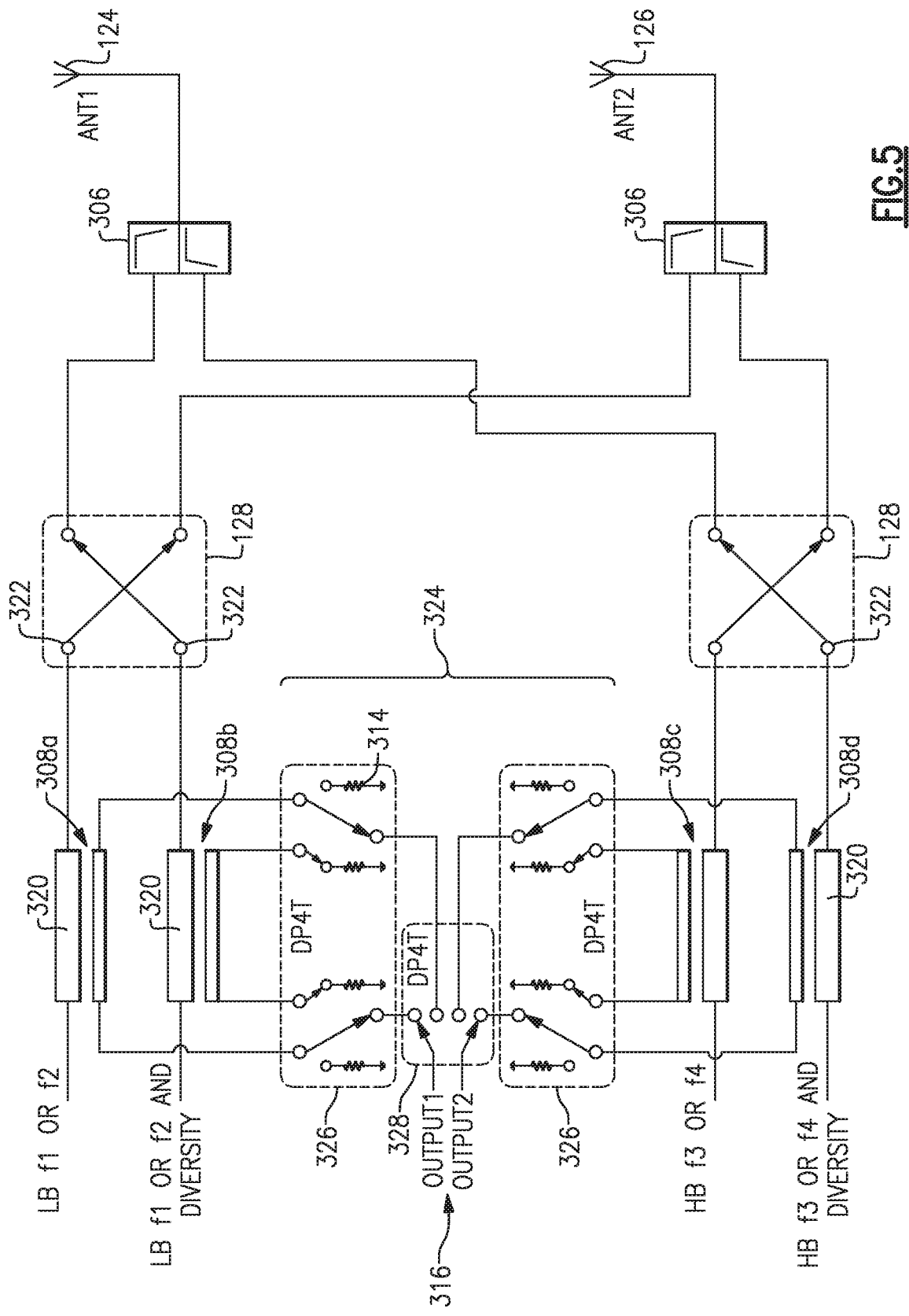
FIG. 5 is a circuit diagram illustrating another example of a partial front-end sub-system of a wireless device configured for dual-band operation.

Accordingly, certain embodiments provide a solution in which each input frequency is directed along its own transmission path and through an individual electromagnetic coupler for power detection. An example of this configuration is shown in FIG. 5. This arrangement provides multiple transmission paths and multiple couplers to accommodate a corresponding number of multiple input frequencies in one or more bands, and avoids both the need for filters in the coupled path and the presence of two or more input frequencies on the same port of any antenna swap switch at the same time.

Referring to FIG. 5, there is illustrated an implementation to accommodate four input frequencies, namely two low-band input frequencies (f1 and f2) and two high-band input frequencies (f3 and f4). In this examples, four couplers 308a-d are provided, one for each input frequency. Each of these four coupler 3081-d is a relatively narrowband coupler, designed for its respective input frequency. The main transmission line 320 of each coupler 308a-d is connected to a corresponding input port 322 of one of the antenna swap switches 128, as shown. Thus, each input frequency f1, f2, f3, and f4 is provided to an individual coupler and to a corresponding port 322 of one of the antenna swap switches 128. As a result, multiple input frequencies are not provided to the same port of any antenna swap switch 128 at the same time and are not coupled onto the same coupled port of any electromagnetic coupler 308a-d at the same time. The coupled path includes a switch network 324 that allows the coupled signals corresponding to each of input frequencies to be provided at the coupler output 316. In the illustrated example, the switch network includes a coupler switch 326 for each frequency band (i.e., the electromagnetic couplers 308a and 308b in the signal paths of the low-band input frequencies are connected to one coupler switch 326 and the electromagnetic couplers 308c and 308d in the signal paths of the high-band input frequencies are connected to another coupler switch 326) and an output switch 328. In this example the coupler switches 326 are double-pole-four-throw switches because each is connected to the forward and reverse coupled ports of two bi-directional electromagnetic couplers; however, a variety of other configurations may be implemented, as will be appreciated by those skilled in the art, given the benefit of this disclosure. Also in the illustrated example the output switch 328 is a double-pole-four-throw switch configured to provide one coupled output signal (Output1 and Output2) for each of the two frequency bands (low-band and high-band); however, a variety of other configurations may be implemented, as will be appreciated by those skilled in the art, given the benefit of this disclosure.

The sub-system implementation illustrated in FIG. 5 is configured for dual-band operation (e.g., low-band and high-band as illustrated) and two input frequencies in each band. However, the concepts disclosed herein may be readily extended to more than two frequency bands or more than two input frequencies in any of one or more frequency bands.

Figure 4:
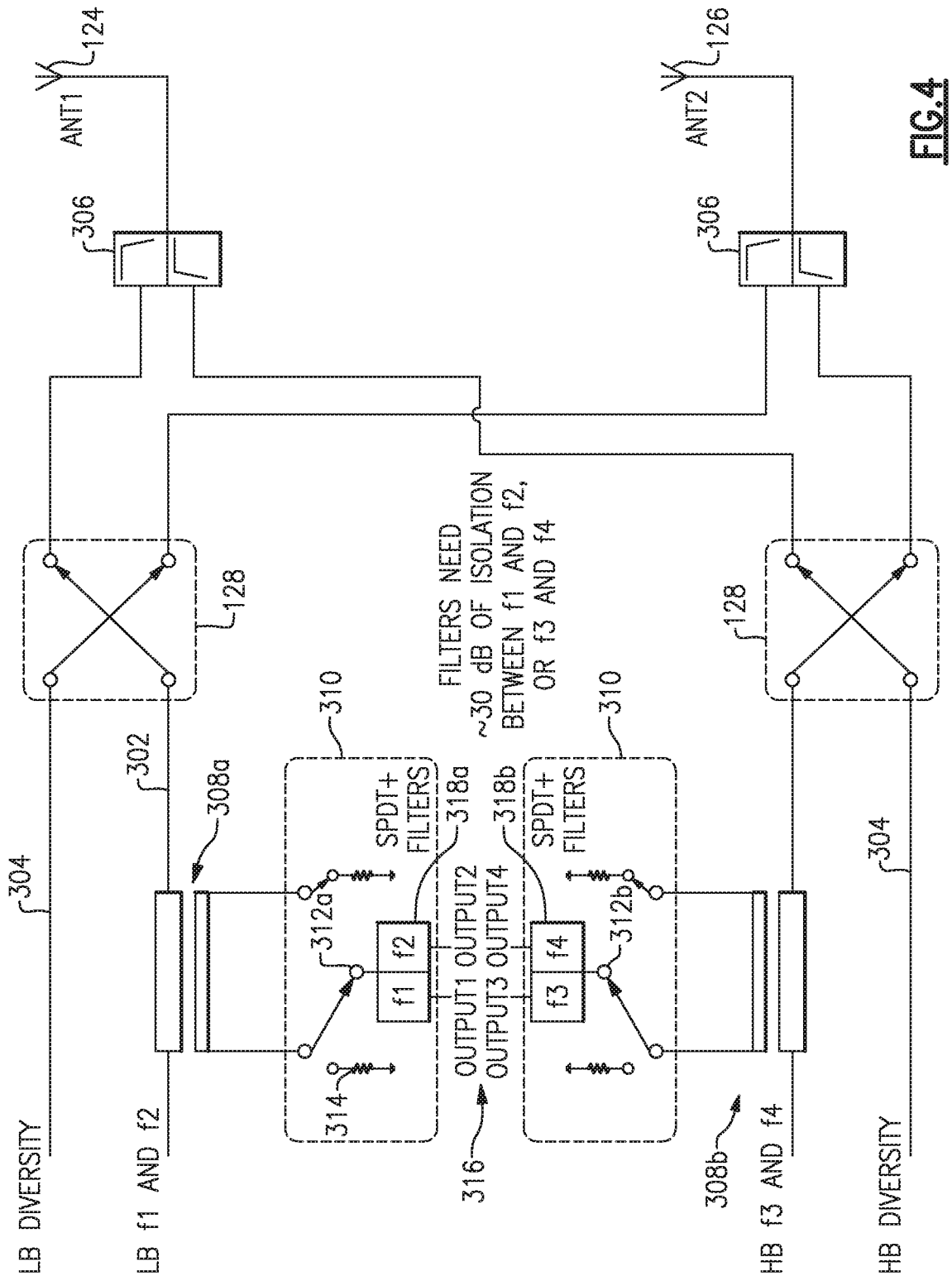
FIG. 4 is a diagram illustrating another example of a partial front-end sub-system of a wireless device configured for dual-band operation.
Figure 6:
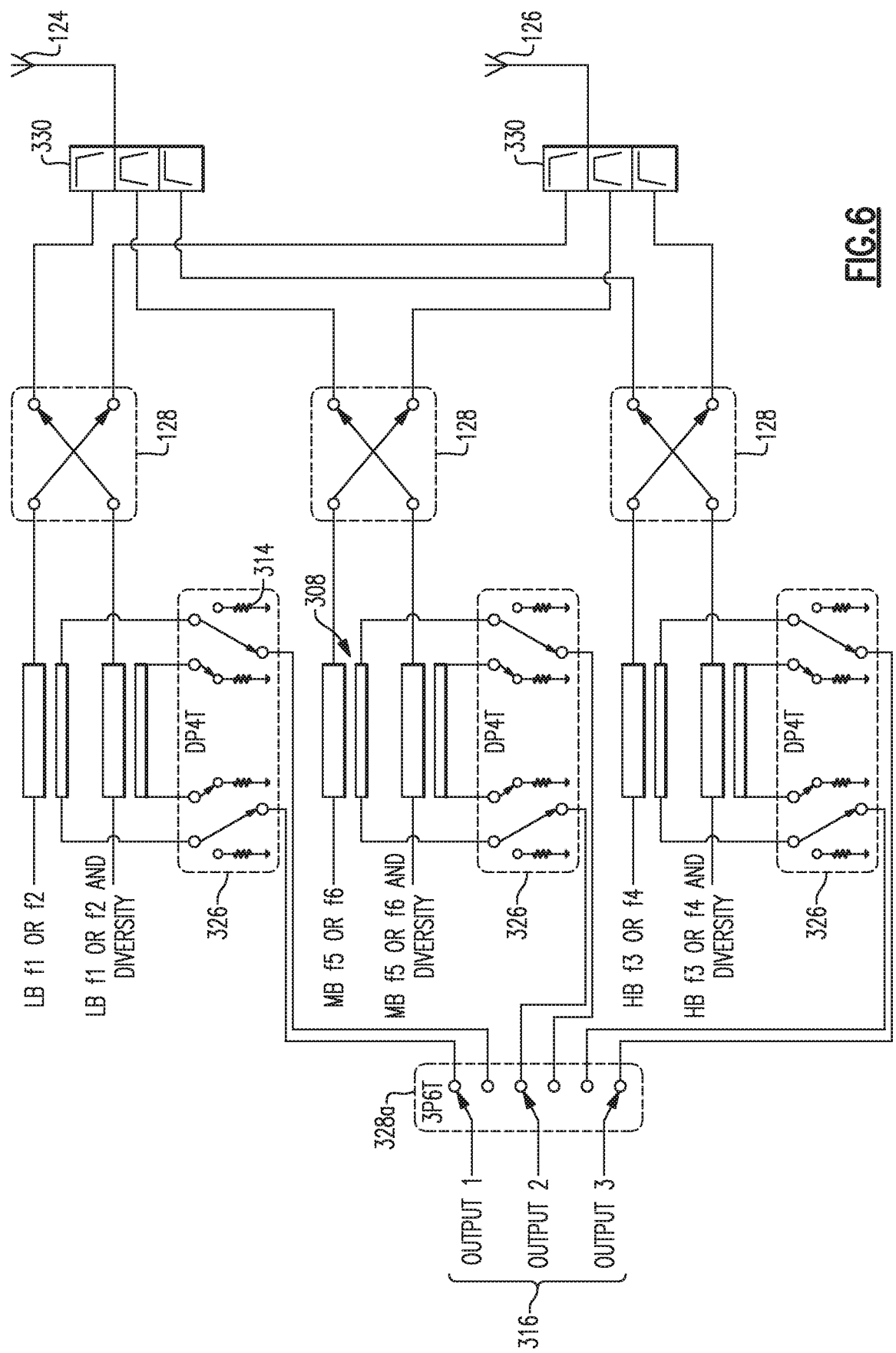
FIG. 6 is a diagram illustrating another example of a partial front-end sub-system of a wireless device configured for three-band operation.

For example, FIG. 6 illustrates an implementation configured for three-band operation, including low-band, mid-band, and high-band, with two input frequencies in each band. In this case, the diplexers 306 shown in FIGS. 3-5 are replaced with tri-plexers 330 to accommodate the three frequency bands of operation. In the example illustrated in FIG. 6 the output switch 328a is a three-pole-six-throw switch to allow the coupler output 316 to include one coupled signal for each frequency band at a time; however, a variety of other configurations may be implemented, as will be appreciated by those skilled in the art, given the benefit of this disclosure.

Figure 7:
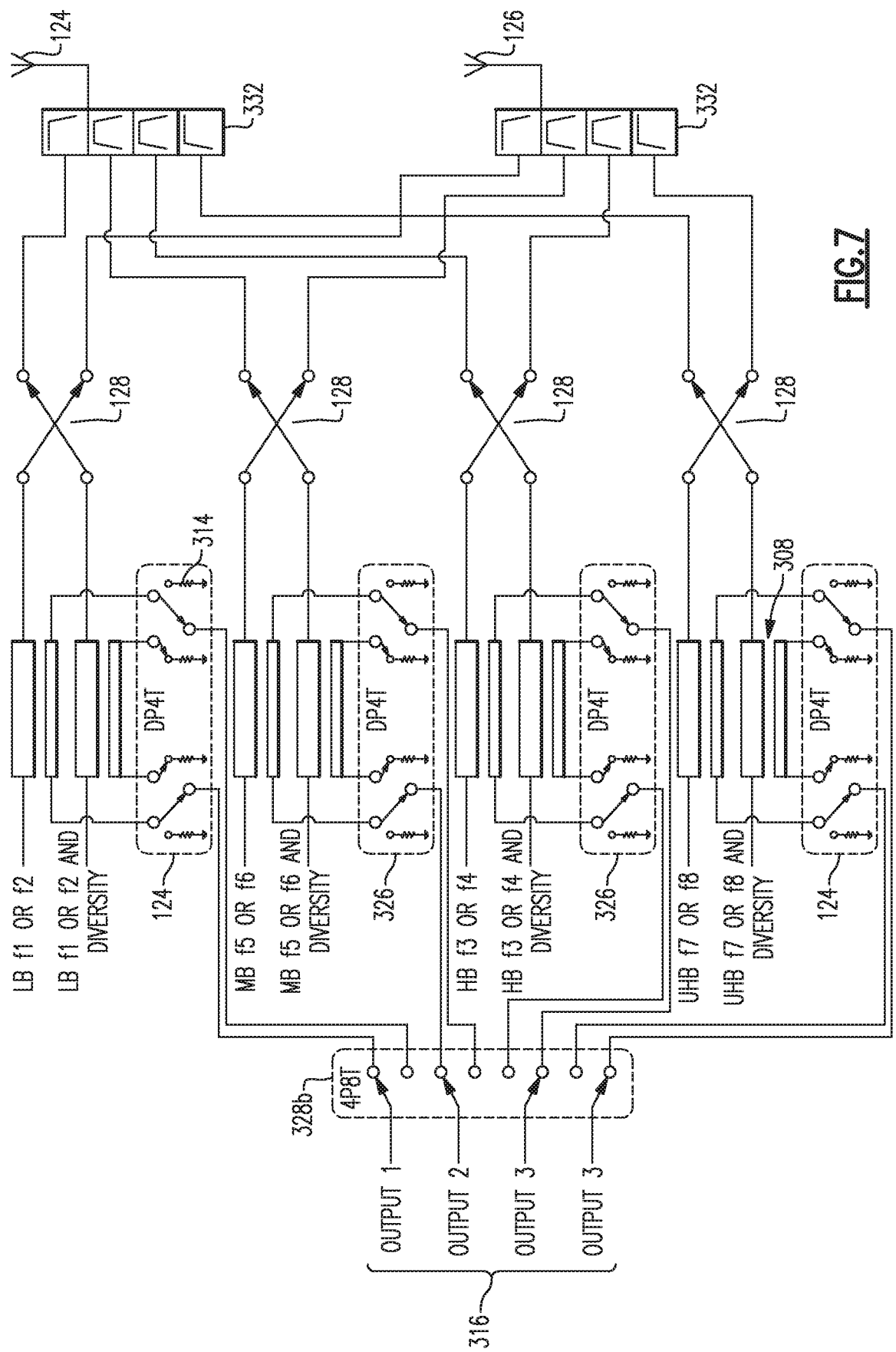
FIG. 7 is a diagram illustrating another example of a partial front-end sub-system of a wireless device configured for four-band operation.

FIG. 7 illustrates another example of an implementation configured for four-band operation, including low-band, mid-band, high-band, and ultra-high-band, with two input frequencies in each band. In this example the tri-plexers 330 shown in FIG. 6 are replaced with quad-plexers 332 to accommodate the four frequency bands of operation. Additionally, in this example the output switch 328b is a four-pole-eight-throw switch to allow the coupler output 316 to include one coupled signal for each frequency band at a time; however, a variety of other configurations may be implemented, as will be appreciated by those skilled in the art, given the benefit of this disclosure.

In each of the examples shown in FIGS. 5-7, and variations thereof, the desired isolation between the coupled signals corresponding different input frequencies is achieved by leveraging the natural isolation between the different antennas 124 and 126 (e.g., approximately 10 dB), the isolation between switches 326 or 328 in the switch network 324 (e.g., approximately 20 dB), and the isolation between ports of the antenna swap switch 128 and the natural isolation achieved by using different and physically separate transmission paths for each input frequency (approximately 30 dB). As a result, a high level of isolation or discrimination between different coupled signals corresponding to different input frequencies can be achieved without the use of filters in the coupled path. As discussed above this arrangement provides the additional benefit of relaxing the linearity requirements for the antenna swap switches because multiple input frequencies are not provided at the same switch port at the same time.

Figure 8A:
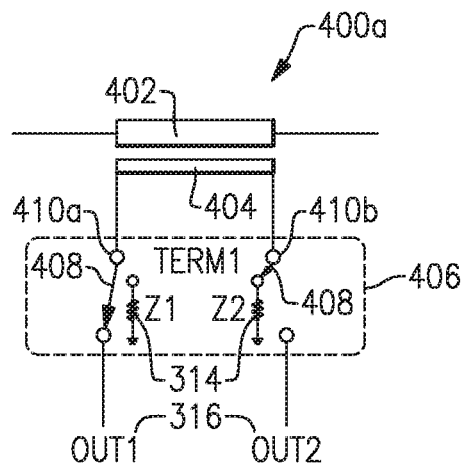
FIG. 8A is a block diagram of one example of a bi-directional electromagnetic coupler.

As discussed above, in certain embodiments the electromagnetic couplers 308 are bi-directional couplers. Bi-directional electromagnetic couplers can be implemented in a variety of different ways. For example, FIG. 8A illustrates an implementation in which a bi-directional electromagnetic coupler 400a includes a main transmission line 402, a coupled transmission line 404, and a termination circuit 406 connected to the coupled transmission line. In this example the termination circuit 406 includes a pair of single-pole-double-throw switches 408 that respectively connect first and second coupled ports 410a, 410b of the bi-directional electromagnetic coupler 400a to either a termination load 314 or to the coupler output 316. For transmit signal flow along the main transmission line 402 from left to right in the diagram, the bi-directional electromagnetic coupler 400a is shown configured for forward power detection, with the first coupled port 410a providing a signal OUT1 at the coupler output 316 and the second coupled port 410b, acting as the isolation port in this configuration, connected to a termination load having a termination impedance value Z2. Actuating the pair of switches 408 into the opposite configuration, with the first coupled port 410a connected to a termination load having an impedance value Z1 and the second coupled port 410b providing a signal OUT2 at the coupler output 316, configures the bi-directional electromagnetic coupler for reverse power detection. As will be appreciated by those skilled in the art, the pair of single-pole-double-throw switches 408 may be replaced by a double-pole-double-throw switch, for example. The bi-directional electromagnetic coupler 400a is shown in FIG. 8A as having two termination loads 314; however, the two termination loads may be replaced by a single termination load 314 that is shared between the forward and reverse power detection modes. In certain examples the bi-directional electromagnetic coupler 400a can include a single termination load 314 that is adjustable such that it can present two different impedance values Z1 or Z2 depending on the mode of power detection or the frequency of operation.

Figure 8B:
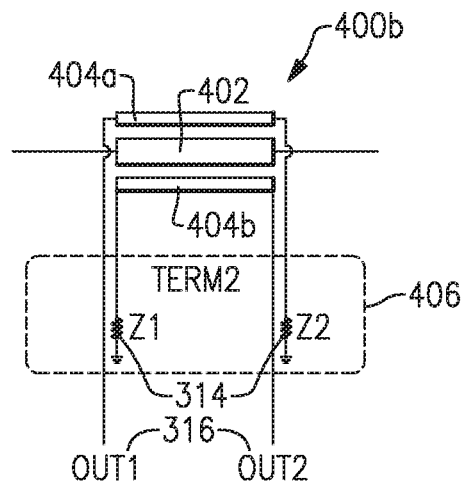
FIG. 8B is a block diagram of another example of a bi-directional electromagnetic coupler.

FIG. 8B illustrates another example of a bi-directional electromagnetic coupler 400b that includes a pair of coupled transmission lines 404a, 404b to allow for simultaneous forward and reverse coupling and power detection. As shown, the first coupled transmission line 404a is connected to the coupler output 316 (providing signal OUT1) and to a termination load 314 having an impedance value Z2, and the second coupled transmission line 404b is similarly connected to the coupler output 316 (providing signal OUT2) and to a termination load 314 having an impedance value Z1. This configuration eliminates the need for switches 408 and allows simultaneous forward and reverse power detection.

Figure 8C:
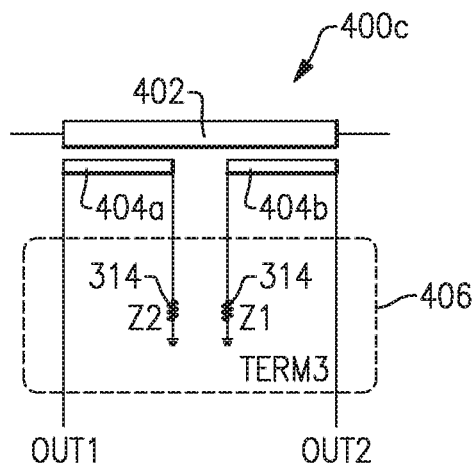
FIG. 8C is a block diagram of another example of a bi-directional electromagnetic coupler.

FIG. 8C illustrates a variation on the example shown in FIG. 8B. In FIG. 8B, the coupled transmission lines 404a and 404b are positioned on either side the main transmission line 402. In the example shown in FIG. 8C, the coupled transmission lines 404a and 404b are positioned on the same side of the main transmission line 402, and each connected to a termination load 314 and to the coupler output 316. This arrangement similarly allows for simultaneous forward and reverse power detection.

Any of the termination loads 314 can be made adjustable to optimize performance for a particular input frequency or frequency band of operation. In some examples an adjustable termination load 314 can be implemented by providing one or more tunable impedance elements, such as a tunable or variable capacitor, inductor, or resistor. In other examples an adjustable termination load 314 can be implemented by providing a switched network of passive impedance elements, any of which can have fixed or variable values. FIGS. 9A-D illustrate various examples of switchable impedance networks that can be used to implement any of the termination loads 314 in any examples of the electromagnetic couplers disclosed herein.

Referring to FIG. 9A, in one example an adjustable termination load 314a includes a plurality of switchable arms 420. In this example, each arm includes a series combination of a capacitor 422, an inductor 424, and a resistor 426. However, as will be appreciated by those skilled in the art, many variations can be implemented. For example, any one or more of the arms 420 can include one or more passive or active capacitive, resistive, or inductive components, or any combination thereof, and the configuration of the arms 420 is not limited to the particular example shown in FIG. 9A. Any of the capacitor 422, inductor 424, or resistor 426 may have different values between different arms 420. A plurality of switches 428 can be actuated to connect any combination of one or more arms 420 to provide the adjustable termination load 314*a* with a desired impedance value.

FIG. 9B illustrates another example in which an adjustable termination load 314*b* includes an impedance network 430 including a plurality of impedance elements 432 and a switch network 434 including a plurality of switches 428 that can selectively connect together any one or more of the impedance elements 432 to achieve a desired impedance value for the adjustable termination load 314*b*. The impedance elements 432 can include any one or more active or passive resistive, capacitive, or inductive components, or any combination thereof. The plurality of switches 428 in the switch network 434 can be actuated individually or together.

As illustrated in FIG. 9C in another example an adjustable termination load 314*c* can include a termination impedance circuit 436 that includes switches 428 and passive impedance elements R1*a* to R1*n*, L1*a* to L1*n*, and C1*a* to C21*n*. Each of the switches 428 can selectively switch in a respective passive impedance element to the termination impedance provided to the isolation port of an electromagnetic coupler. In the example illustrated in FIG. 9C the switches 428 of the termination impedance circuit 436 include three banks of parallel switches in series with each other. Having banks of switches in parallel with other banks of parallel switches can increase the number of possible termination impedance values provided by the termination impedance circuit 436. For example, when the termination impedance circuit 436 includes three banks of three parallel switches in series with each other, the termination impedance circuit can provide 343 different termination impedance values by having one or more of the switches in each bank of switches on while the other switches are off. In the example illustrated in FIG. 9C, the termination impedance circuit 436 includes series circuits that each include a passive impedance element and a switch in parallel with other series circuits that include other passive impedance elements and other switches. For instance, a first series circuit that includes a switch 428 and the resistor R1*a* is in parallel with a second series circuit that includes another switch 428 and the resistor R1*b*. The termination impedance circuit 436 further includes switches 428 to switch inductors L1*a* to L1*n* in series with one or more resistors R1*a* to R1*n*, or in parallel with one another. The switches 428 can also switch capacitors C1*a* to C1*n* in series with one or more RL circuits or in parallel with each other, for example.

The termination impedance circuit 436 can include passive impedance elements having arbitrary values, binary weighted values, values to compensate for variations, values for a particular application, the like, or any combination thereof. While the termination impedance circuit 436 can provide RLC circuits, any suitable combination of circuit elements such as one or more resistors, one or more inductors, one or more capacitors, one or more RL circuits, one or more RC circuits, one or more LC circuits, or one or more RLC circuits can be configured to provide a desired termination impedance. Such combinations of circuit elements can be arranged in any suitable series and/or parallel combination.

FIG. 9D illustrates an adjustable termination load 314*d* implemented as a variation on the example shown in FIG. 9C. In FIG. 9C, each of the passive impedance elements in the termination impedance circuit 436 is individually switchable with an associated switch 428. FIG. 9D illustrates another example of a termination impedance circuit 436 in which some passive impedance elements can be individually switched, while others are switched together as a group by a single switch. For example, switch 438 switches a series RLC combination. FIG. 9D also illustrates that different passive impedance elements can be ratioed to each other (e.g., capacitors 0.1C and 0.2C; resistors 0.1R, 0.2R, and 0.4R) and can be selectively switched in individually or in parallel with each other. Such impedance elements can be used to compensate for process variations or to configure an electronic system for certain applications, for example.

The switches 428 and 438 can be implemented by field effect transistors, for example. Alternatively, or additionally, one or more switches 428, 438 can be implemented by MEMS switches, fuse elements (e.g., fuses or antifuses), or any other suitable switch element.

While the various adjustable termination loads illustrated in FIGS. 9A-D include switches, a tunable termination load can alternatively or additionally be provided by other variable impedance circuits. For instance, an adjustable termination load can use an impedance element having an impedance that varies as a function of a signal provided to impedance element. As one example, a field effect transistor operating in the linear mode of operation can provide an impedance dependent on a voltage provided to its gate. As another example, a varactor diode can provide a variable capacitance as a function of voltage provided to the varactor diode.

Thus aspects and embodiments provide a coupling methodology and circuit arrangements that can allow for simultaneous power detection and operation at multiple input frequencies and in multiple frequency bands without requiring the use of filters in the coupled path and without imposing unreasonable linearity requirements on the antenna swap switches. As discussed above, each of the couplers 308 can be a narrowband, frequency-selective coupler that is specifically designed for its corresponding input frequency. For example, each coupler 308 can be optimized to have a desired coupling factor, and the termination impedances can be tuned such that the directivity of each coupler can be optimized for its respective input frequency. This allows high performance and accurate power detection to be achieved at each frequency band of interest. In addition, because each input frequency is provided through a dedicated signal path, both simultaneous detection/measurement and simultaneous transmission of multiple frequencies can be accomplished without introducing intermodulation distortion products at the antenna swap switches 128. As a result, the linearity requirements for the antenna swap switches can be relaxed. Thus, aspects and embodiments advantageously provide simultaneous multi-frequency precision power detection in an antenna swap architecture.

Embodiments of the coupling arrangements disclosed herein can be implemented in a variety of different electronic devices or modules including, for example, a stand-alone RF coupler, an antenna switch module, a module combining an RF coupler and an antenna switch module, an impedance matching module, an antenna tuning module, or a wireless device (e.g., cell phones, tablets, etc.). Examples of electronic devices can include, but are not limited to, consumer electronic products, parts of the consumer electronic products, electronic test equipment, cellular communications infrastructure such as a base station, etc. Further, the electronic devices can include unfinished products.

FIG. 10 is a block diagram of a wireless device 500 including a coupler module 502 according to certain embodiments. The wireless device 500 can be a cellular phone, smart phone, tablet, modem, communication network or any other portable or non-portable device configured for voice and/or data communication. The wireless device 500 includes the antennas 124 and 126 that receive and transmit power signals, as discussed above.

A transceiver 504 is configured to generate signals for transmission and/or to process received signals. In some embodiments, transmission and reception functionalities can be implemented in separate components (e.g. a transmit module and a receiving module), or be implemented in the same module.

Signals generated for transmission are received by a power amplifier (PA) module 506, which can include one or more PA's to amplify one or more of the generated signals from the transceiver 504. The power amplifier module 506 can be used to amplify a wide variety of RF or other frequency-band transmission signals. For example, the power amplifier module 506 can receive an enable signal that can be used to pulse the output of the power amplifier to aid in transmitting a wireless local area network (WLAN) signal or any other suitable pulsed signal. The power amplifier module 506 can be configured to amplify any of a variety of types of signal, including, for example, a Global System for Mobile (GSM) signal, a code division multiple access (CDMA) signal, a W-CDMA signal, a Long Term Evolution (LTE) signal, or an EDGE signal. In certain embodiments, the power amplifier model 506 and associated components including switches and the like can be fabricated on GaAs substrates using, for example, pHEMT or BiFET transistors, or on a Silicon substrate using CMOS transistors. The power amplifier module 506 can be configured to provide the one or more input frequencies to the coupler module 502, which includes an appropriate number of electromagnetic couplers 308 depending on the number of input frequencies expected, as discussed above.

An antenna switch module 508 can include one or more antenna swap switches 128 and be configured to selectively couple the input frequencies to one of the antennas 124, 126 and/or to switch between transmit and receive modes, for example, as discussed above. As shown in FIG. 10 and as discussed above, in certain examples the antennas 124, 126 both receive signals that are provided to the transceiver 504 via the antenna switch module 508 and also transmit signals from the wireless device 500 via the transceiver 504, the power amplifier module 506, the coupler module 502, and the antenna switch module 508.

The coupler module 502 can be used to measure transmitted power signals from the power amplifier module 506 and provides one or more coupled signals (coupler output 316) to a sensor module 510. The sensor module 510 can in turn send information to the transceiver 504 and/or directly to the power amplifier module 506 as feedback for making adjustments to regulate the power level of the power amplifier module 506. In this way the coupler module 502 can be used to boost/decrease the power of a transmission signal having a relatively low/high power. It will be appreciated, however, that the coupler module 502 can be used in a variety of other implementations.

In certain embodiments in which the wireless device 500 is a mobile phone having a time division multiple access (TDMA) architecture, the coupler module 502 can advantageously manage the amplification of an RF transmitted power signal from the power amplifier module 806. In a mobile phone having a time division multiple access (TDMA) architecture, such as those found in Global System for Mobile Communications (GSM), code division multiple access (CDMA), and wideband code division multiple access (W-CDMA) systems, the power amplifier module 506 can be used to shift power envelopes up and down within prescribed limits of power versus time. For instance, a particular mobile phone can be assigned a transmission time slot for a particular frequency channel. In this case the power amplifier module 506 can be employed to aid in regulating the power level one or more RF power signals over time, so as to prevent signal interference from transmission during an assigned receive time slot and to reduce power consumption. In such systems, the coupler module 502 can be used to measure the power of a power amplifier output signal to aid in controlling the power amplifier module 506, as discussed above.

Signals received by the antennas 124, 126 can be provided via the antenna switch module 508 to a low noise amplifier (LNA) module 512, which may include one or more amplifiers. The received signals are amplified by the low noise amplifier module 512 and then provided to the transceiver 504.

Still referring to FIG. 10, the wireless device 500 further includes a power management system 514 that is connected to the transceiver 504 that manages the power for the operation of the wireless device. The power management system 514 can also control the operation of a baseband sub-system 516 and other components of the wireless device 500. In certain examples the power management system 514 includes, or is connected to, a power source, such as a battery (not shown) that provides power to the wireless device 500. The power management system 514 may further include one or more processors or controllers that can control the transmission of signals.

In one embodiment, the baseband sub-system 516 is connected to a user interface 518 to facilitate various input and output of voice and/or data provided to and received from the user. The baseband sub-system 516 can also be connected to memory 520 that is configured to store data and/or instructions to facilitate the operation of the wireless device, and/or to provide storage of information for the user.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and it is to be appreciated that embodiments of the methods and apparatuses discussed herein are not limited in application to the details of construction and the arrangement of components set forth in the description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. The scope of the invention should be determined from proper construction of the appended claims, and their equivalents.

What is claimed is:

1. A wireless device front-end apparatus configured for multi-frequency operation using a plurality of antennas, the apparatus comprising:
    an antenna switch module including a plurality of antenna swap switches, each respective antenna swap switch having first and second antenna contacts for connecting to first and second antennas, respectively, and first and second input ports;
    a coupler assembly connected to the plurality of antenna swap switches, the coupler assembly including a plurality of electromagnetic couplers corresponding in number to each of the first and second input ports of the plurality of antenna swap switches, each respective electromagnetic coupler having an input port configured to receive an input signal of a unique frequency, a coupled port, an output port connected to one of the first and second input ports of a respective one of the plurality of antenna swap switches, and an isolation port, each respective electromagnetic coupler being configured to provide a coupled signal at the coupled port of the respective electromagnetic coupler responsive to receiving the input signal at the input port;
    a termination network including a plurality of termination loads; and
    an output switch network configured to selectively connect the coupled ports of each of the plurality of electromagnetic couplers to a coupler output bank to provide the coupled signals at the coupler output bank, and to selectively connect the isolation ports of each of the plurality of electromagnetic couplers to one of the plurality of termination loads.

2. The apparatus of claim 1 wherein the coupler output bank includes a number of coupler output contacts corresponding to half the number of electromagnetic couplers in the plurality of electromagnetic couplers.

3. The apparatus of claim 1 wherein each of the plurality of antenna swap switches is a double-pole double throw switch and is connected to two of the plurality of electromagnetic couplers.

4. The apparatus of claim 1 wherein the plurality of electromagnetic couplers includes at least four electromagnetic couplers, two of the at least four electromagnetic couplers being configured to receive input signals in a first frequency band, and another two of the at least four electromagnetic couplers being configured to receive input signals in a second frequency band higher than the first frequency band, the first and second frequency bands being non-overlapping in frequency.

5. The apparatus of claim 4 wherein the antenna switch module further includes a first diplexer connected between the plurality of antenna swap switches and the first antenna contact, and a second diplexer connected between the plurality of antenna swap switches and the second antenna contact.

6. The apparatus of claim 4 wherein the plurality of electromagnetic couplers further includes an additional pair of electromagnetic couplers configured to receive input signals in a third frequency band different from the first and second frequency bands.

7. The apparatus of claim 6 wherein the antenna switch module further includes a first triplexer connected between the plurality of antenna swap switches and the first antenna contact, and a second triplexer connected between the plurality of antenna swap switches and the second antenna contact.

8. The apparatus of claim 1 wherein each termination load of the plurality of termination loads has an adjustable impedance.

9. The apparatus of claim 8 wherein each termination load of the plurality of termination loads includes a plurality of switchable passive impedance elements, the plurality of switchable passive impedance elements including at least one resistive element and one or more capacitive or inductive elements.

10. The apparatus of claim 1 wherein each of the plurality of electromagnetic couplers is bi-directional, and wherein the output switch network is further configured to switch operation of the plurality of electromagnetic couplers between a forward power detection mode and a reverse power detection mode.

11. A wireless device comprising:
    first and second antennas;
    a transceiver configured to produce a plurality of input signals each having a unique frequency;
    a power amplifier module configured to receive and amplify the plurality of input signals from the transceiver to produce a plurality of amplified input signals;
    an antenna switch module including a plurality of antenna swap switches, each respective antenna swap switch having first and second antenna contacts coupled to the first and second antennas, respectively, and first and second input ports;
    a plurality of electromagnetic couplers connected between the power amplifier module and the antenna switch module, the plurality of electromagnetic coupler corresponding in number to each of the first and second input ports of the plurality of antenna swap switches, each respective electromagnetic coupler of the plurality of electromagnetic couplers having an input port configured to receive a respective amplified input signal of the plurality of amplified input signals from the power amplifier module, a coupled port, an output port connected to one of the first and second input ports of a respective one of the plurality of swap switches, and an isolation port, each electromagnetic coupler being configured to provide a coupled signal at the coupled port a coupled signal responsive to receiving the respective amplified input signal at the input port;
    a termination network including a plurality of termination loads; and
    an output switch network configured to selectively connect the coupled ports of each of the plurality of electromagnetic couplers to a coupler output bank to provide the coupled signals at the coupler output bank, and to selectively connect the isolation ports of each of the plurality of electromagnetic couplers to one of the plurality of termination loads.

12. The wireless device of claim 11 further comprising a sensor module coupled to the coupler output bank and configured to receive and process the coupled signals.

13. The apparatus of claim 11 wherein the coupler output bank includes a number of coupler output contacts corresponding to half the number of electromagnetic couplers in the plurality of electromagnetic couplers.

14. The apparatus of claim 11 wherein each of the plurality of antenna swap switches is a double-pole double throw switch and is connected to two of the plurality of electromagnetic couplers.

15. The apparatus of claim 11 wherein the plurality of electromagnetic couplers includes at least four electromagnetic couplers, two of the at least four electromagnetic couplers being configured to receive amplified input signals in a first frequency band, and another two of the at least four electromagnetic couplers being configured to receive amplified input signals in a second frequency band higher than the first frequency band, the first and second frequency bands being non-overlapping in frequency.

16. The apparatus of claim 15 wherein the antenna switch module further includes a first diplexer connected between the plurality of antenna swap switches and the first antenna contact, and a second diplexer connected between the plurality of antenna swap switches and the second antenna contact.

17. The apparatus of claim 15 wherein the plurality of electromagnetic couplers further includes an additional pair of electromagnetic couplers configured to receive amplified input signals in a third frequency band different from the first and second frequency bands.

18. The apparatus of claim 17 wherein the antenna switch module further includes a first triplexer connected between the plurality of antenna swap switches and the first antenna contact, and a second triplexer connected between the plurality of antenna swap switches and the second antenna contact.

19. The apparatus of claim 11 wherein each termination load of the plurality of termination loads has an adjustable impedance.

20. The apparatus of claim 19 wherein each termination load of the plurality of termination loads includes a plurality of switchable passive impedance elements, the plurality of switchable passive impedance elements including at least one resistive element and one or more capacitive or inductive elements.

* * * * *